United States Patent [19]

Worsley et al.

[11] Patent Number: 4,487,013
[45] Date of Patent: Dec. 11, 1984

[54] T-ROD CHAIN

[75] Inventors: Gail G. Worsley, Hazel Crest, Ill.; Thomas D. Woodward, Munster, Ind.

[73] Assignee: Agri-Chain Products, Inc., Downers Grove, Ill.

[21] Appl. No.: 468,112

[22] Filed: Feb. 22, 1983

[51] Int. Cl.³ .............................................. F16G 15/04
[52] U.S. Cl. ........................................ 59/84; 59/35.1; 59/85; 59/90; 152/241
[58] Field of Search ...................... 59/35.1, 78, 83, 84, 59/85, 90; 152/241

[56] References Cited

U.S. PATENT DOCUMENTS

| 1,535,279 | 4/1925 | Yoder . | |
| 3,368,344 | 2/1968 | Graetz | 59/84 |
| 3,748,919 | 7/1973 | Cook et al. . | |
| 4,011,715 | 3/1977 | Graetz | 59/85 |

Primary Examiner—W. D. Bray
Attorney, Agent, or Firm—Sidney Wallenstein; Harry V. Strampel

[57] ABSTRACT

A chain link, comprising a rod of substantially circular cross-section formed into a generally Omega shape. The link includes a transverse bight portion, a pair of side portions offset below the bight portion, a pair of curved leg portions, and a pair of foot portions splaying transversely outward from the ends of the leg portions.

6 Claims, 7 Drawing Figures

T-ROD CHAIN

BACKGROUND OF THE INVENTION

This application relates to chain links, and, in particular, to chain links which interlock for easy assembly and disassembly of a chain.

Interlocking chain links have been known for many years. The advantage of this type of chain is that it can be assembled and disassembled without the need to add pins, or to deform the links, and so forth. Therefore, the length of the chain can easily be adjusted in the field by adding or removing links, and a worn or damaged link can readily be replaced in the field.

An example of an interlocking type of link of the prior art is disclosed in U.S. Pat. No. 3,368,344 "Graetz". The "Graetz" links are formed from a rectangular sheet of flat material. The resulting chain has square joints, so the chain does not pivot smoothly over the driving sprocket. Instead, the links slide and jump relative to each other in the portions of the chain near the sprocket, resulting in substantial noise and wear. In the Graetz chain, the sides 7 are at an incline from the direction in which the chain moves, making it difficult to weld on attachments such as scraper blades which are intended to operate in the direction of travel of the chain.

SUMMARY OF THE INVENTION

The embodiment of the present invention described herein provides interlocking chain links which are formed from bar stok of substantially circular cross-section. The bights of the links have a circular cross-section which allows them to readily pivot in the joints, thereby permitting a smooth forward flexing of the chain over a sprocket.

The present invention also provides a link which is designed such that the side portions of the link are parallel to the direction of travel of the chain during normal operation of the chain in order to facilitate attachment of scraper flights or other members which are designed to operate in the direction of travel of the chain.

Since the present invention may be made from bar stock, it can be made more economically than the "Graetz" chain and with no scrap material.

The link of the present invention is also made to reduce the bending moment, thereby reducing the bending load, which tends to open the bent legs of the link. In many of the links of the prior art, it is this bending load and the resulting opening of the bent legs which ultimately cause failure of the links. Reducing the bending moment therefore permits the links of the present invention to operate at a higher tensile load without failure.

DESCRIPTION OF THE PREFERRED EMBODIMENT

Figure 1:
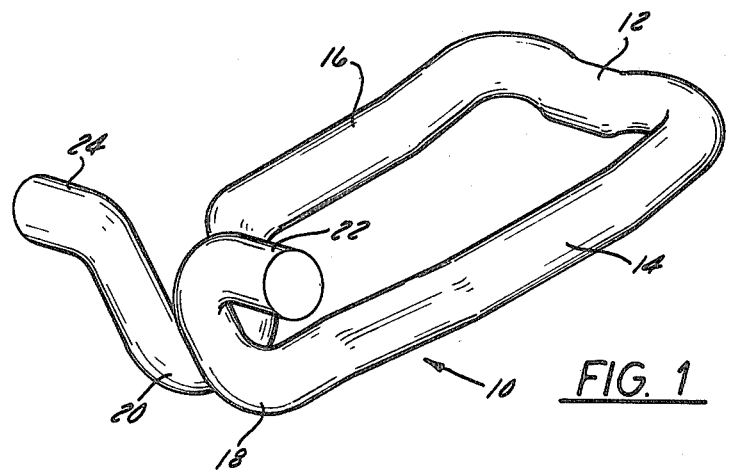
FIG. 1 is a perspective view of a link made in accordance with the present invention.

As shown in the attached drawings, the link 10 of the present invention is formed from a rod of substantially circular cross-section which is bent into a generally Omega shape. The link includes a transverse bight portion 12, and a pair of side portions 14, 16 extending from the bight portion. The side portions 14, 16 lie mostly in a plane 15 (shown in FIG. 3) which is offset below the bight portion 12. At the end of each side portion 14, 16 is a curved leg portion 18, 20. Each of the leg portions 18, 20 first dips below the plane 15 of its respective side portion 14, 16 and then curves upward above the plane 15 of the side portions 14, 16. At the end of each curved leg portion 18, 20 is a foot portion 22, 24 which splays transversely outward.

The curved shape of the leg portions 18, 20 is made to correspond to the curved cross-sectional shape of the transverse bight portion 12 so that the bight portion 12 of one link 10 can nest in the curved leg portions 18, 20 of the adjacent link 10 in order to permit a smooth pivoting of the links relative to each other when the chain flexes over a sprocket.

Figure 6:
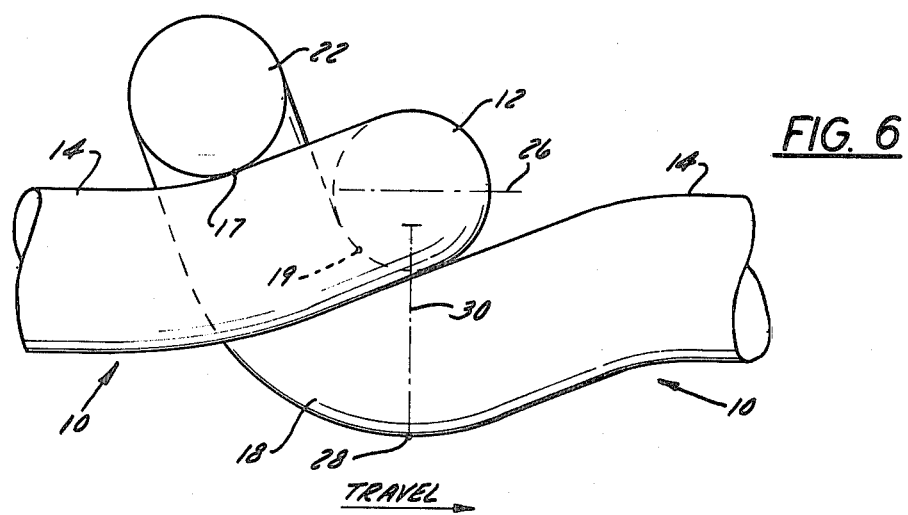
FIG. 6 is an enlarged side view of one of the chain joints shown in FIG. 3.
Figure 3:
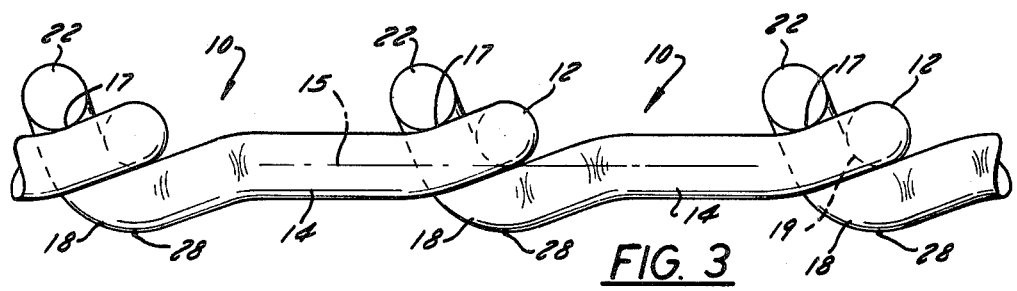
FIG. 3 is a side view of a chain made of links as shown in FIG. 1.
Figure 4:
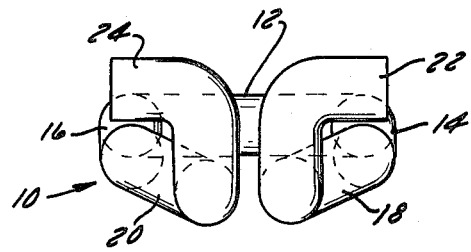
FIG. 4 is a front end view of the link shown in FIG. 1.
Figure 5:
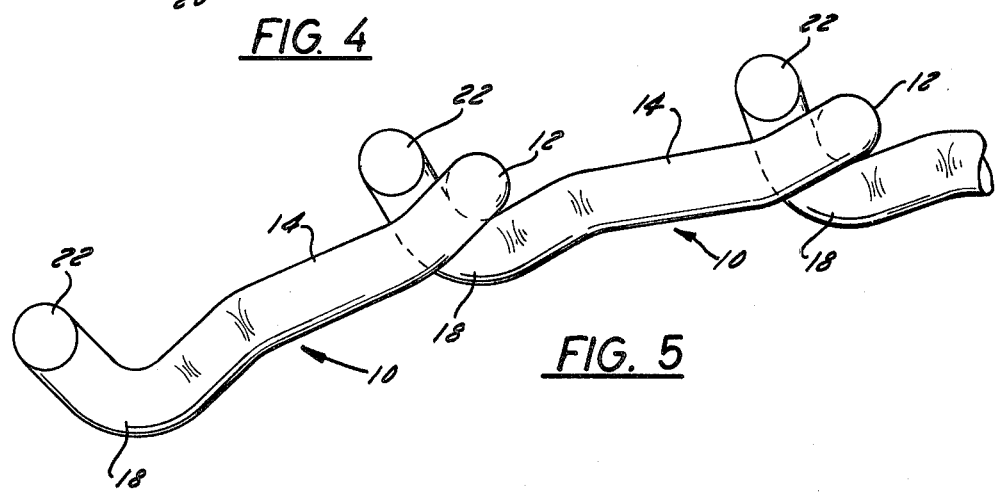
FIG. 5 is a side view of the chain shown in FIG. 3 as it flexes forward as it would flex over a sprocket.

As shown in FIGS. 3 and 6, the foot portions 22, 24 are located so that they contact the side portions 14, 16 of the adjacent link 10 at the point designated 17 in order to maintain the relative positions of the links during normal operation of the chain between the sprockets such that the area of contact between the curved leg portions 18, 20 of one link 10 and the transverse bight portion 12 of the adjacent link 10 designated at 19 is below the centerline 26 of the transverse bight portion 12. Maintaining this position of the links is important, because it means that, when the chain is driven in the direction shown, the driving force will be transmitted from one link to the next along a surface which is very close to the lowest point 28 of the curved leg portions 18, 20. This provides a relatively short moment arm 30 for the force to act upon in trying to open up the curved leg portions 18, 20 and therefore reduces the bending moment for a given driving force. The moment arm from the driving force to the lowest point 28 of the curved leg portions is less than one and one-half times the diameter of the rod.

Figure 7:
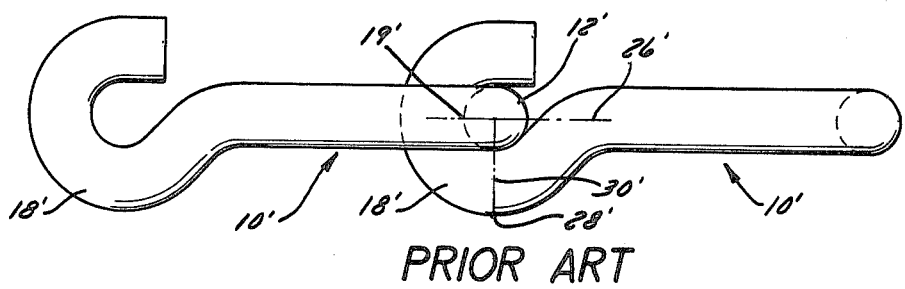
FIG. 7 is a side view of a chain made from links of the prior art.
Figure 2:
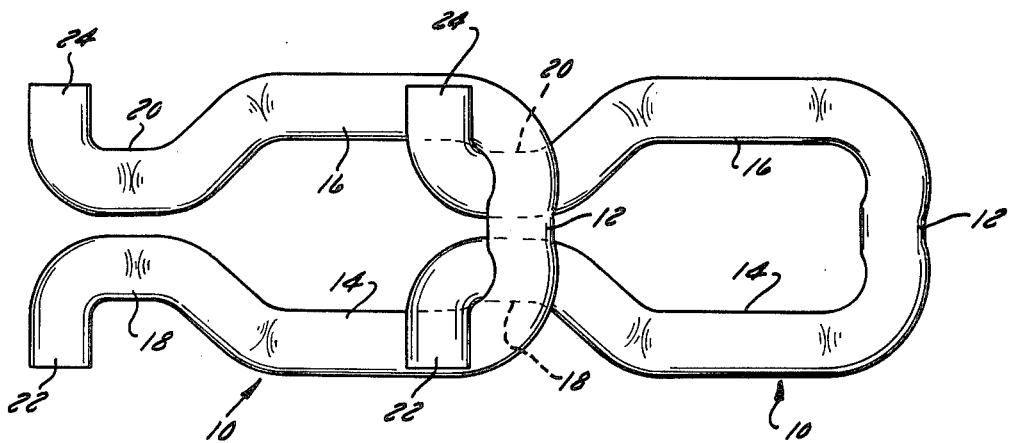
FIG. 2 is a top view of a chain made of links as shown in FIG. 1.

FIG. 7 shows a chain link of the prior art which is made of a rod of circular cross-section. In this link 10', the curved leg portions 18', 20' curve straight back, and there is no splayed transverse foot portion. In normal operation of this chain, the driving force acts along the surface 19, which is essentially the inside half of the bight portion 12'. The force is distributed equally above and below the centerline 26' of the bight portion 12'. The moment arm 30' from the lowest point 28' to the driving force can therefore be drawn as extending to the centerline 26', making its length exactly one and one-half times the diameter of the rod. The force in the prior art link 10' therefore acts at the longer moment arm 30' to open up the curved leg portions. Since the moment arm 30' of the prior art chain is longer than the moment arm 30 of the present chain for any given diameter of rod, the moment acting to open up the prior art chain is larger than the moment acting on the present chain for any given driving force. Since failure of these chains usually occurs in the region of the curved legs 18, 20, 18', 20', due to the moment acting on them, a reduction in the length of the moment arm means either that the links can operate at a higher driving force before failure or that a smaller diameter of rod can be used in the present chain than in prior art chains for a given driving force.

The chain disclosed in Graetz U.S. Pat. No. 3,368,344 referred to earlier has a force acting as in the prior art link 10' despite the fact that the Graetz link includes splayed foot portions. The reason for this is that the foot portions of the Graetz chain do not contact the side portions of the adjacent links to maintain the relative positions of the links as do the foot portions of the present invention. Because the foot portions 22, 24 of the present invention contact the side portions 14, 16 at the points designated 17, they hold the links in such a relative position that the area of contact 19 between the curved legs 18, 20 of one link and the bight 12 of the next link is located below the axis of the bight portion.

In 1982, chain links of the present design shown in FIGS. 1-6 were tested against chain links of the prior art design shown in FIG. 7. It was found that, for chain made from 7/16 inch diameter rod, the prior art links failed at approximately 13,000 pounds of driving force, while the links of the present invention did not fail until approximately 15,500 pounds of driving force. This illustrates the superiority of the present links, which is thought to be caused at least in part by the reduced moment arm 30.

It will be clear to those skilled in the art that various modifications could be made to this basic design without departing from the scope of the present invention.

What is claimed is:

1. A chain link, comprising:
    a rod of substantially circular cross-section formed into a generally Omega shape, including:
    a transverse bight portion;
    a pair of side portions extending therefrom and lying substantially in a plane which is offset below said bight portion;
    a pair of curved leg portions extending from said side portions, each of said leg portions first dipping below the plane of said side portions and then curving upward, above the plane of said side portions; and
    a pair of foot portions splaying transversely outward from the ends of said leg portions.

2. A chain link as recited in claim 1, wherein the curvature of said curved leg portions is predetermined to conform to the circular cross-sectional shape of said transverse bight portion in order to receive the transverse bight portion of an adjacent identical link in a nesting fashion to permit a smooth pivoting of the links relative to each other when flexing over a sprocket.

3. A chain link as recited in claim 2, wherein said splayed foot portions are located so as to contact an identical adjacent link in order to maintain the relative position of said links so that the area of contact between the curved leg portions of said link and the transverse bight portion of the adjacent link is below the centerline of the transverse bight portion of said adjacent link.

4. A chain adapted to be driven by sprockets, comprising:
    a plurality of links, in number to form a chain, each of said links being formed from a rod of substantially circular cross-section into a generally Omega shape, including:
    (a) a transverse bight portion;
    (b) a pair of side portions extending therefrom and lying in a plane which is offset below said bight portion;
    (c) a pair of curved leg portions extending from said side portions, each of said leg portions first dipping below the plane of said side portions and then curving upward, above the plane of said side portions; and
    (d) a pair of foot portions splaying transversely outward from said leg portions;
    wherein said transverse bight portions of said links are nested in said curved leg portions of the adjacent links.

5. A chain as recited in claim 4, wherein the curvature of said curved leg portions corresponds to the circular cross-sectional shape of said transverse bight portions to permit a smooth forward flexing of the links over a sprocket.

6. A chain as recited in claim 5, wherein said foot portions contact the adjacent links in order to maintain the relative position of said links so that, during normal operation of the chain, the side sections of the links between the sprockets are aligned in a single plane, and contact between the curved leg portions of the links and the transverse bight portions of the adjacent links occur along surfaces which are below the centerlines of said transverse bight portions.

* * * * *